United States Patent
Thexton et al.

(10) Patent No.: US 6,772,435 B1
(45) Date of Patent: Aug. 3, 2004

(54) DIGITAL VIDEO BROADCAST SYSTEM

(75) Inventors: Nicholas Thexton, London (GB); Martin Gold, Chilbolton (GB); Yorai Feldman, Har Adar (IL)

(73) Assignee: NDS Limited, Eastleigh (GB)

( * ) Notice: Subject to any disclaimer, the term of this patent is extended or adjusted under 35 U.S.C. 154(b) by 0 days.

(21) Appl. No.: 09/171,323
(22) PCT Filed: Apr. 15, 1997
(86) PCT No.: PCT/GB97/01025

§ 371 (c)(1),
(2), (4) Date: Nov. 3, 1998

(87) PCT Pub. No.: WO97/39582

PCT Pub. Date: Oct. 23, 1997

Related U.S. Application Data

(60) Provisional application No. 60/015,460, filed on Apr. 15, 1996.

(51) Int. Cl.[7] .......................... H04N 5/445; H04N 7/116
(52) U.S. Cl. ............................. 725/91; 725/56; 725/95; 725/114; 725/144
(58) Field of Search ............................ 725/30, 56, 114, 725/116, 144, 146, 50, 95, 91; 370/229, 324, 337, 338, 341, 345, 347, 350, 503

(56) References Cited

U.S. PATENT DOCUMENTS

| | | | | |
|---|---|---|---|---|
| 5,420,866 A | * | 5/1995 | Wasilewski | ............. 370/110.1 |
| 5,519,780 A | * | 5/1996 | Woo et al. | |
| 5,521,979 A | * | 5/1996 | Deiss | |
| 5,659,350 A | * | 8/1997 | Hendricks | ...................... 348/6 |
| 6,105,134 A | * | 8/2000 | Pinder et al. | |
| 6,157,719 A | * | 12/2000 | Wasilewski et al. | |
| 6,160,989 A | * | 12/2000 | Hendricks | ................... 455/4.2 |
| 6,389,593 B1 | * | 5/2002 | Yamagishi | ..................... 725/9 |

FOREIGN PATENT DOCUMENTS

| | | |
|---|---|---|
| EP | 0 620 689 A1 | 10/1994 |
| WO | WO 96/08109 | 3/1996 |

OTHER PUBLICATIONS

Remote Consensual Control of Multimedia Presentations, IBM Technical Disclosure Bulletin, vol. 36, No. 07 Jul. 1993, pp. 169–170.

* cited by examiner

Primary Examiner—Vivek Srivastava
Assistant Examiner—Krista Bui
(74) Attorney, Agent, or Firm—Cohen, Pontani, Lieberman & Pavane

(57) ABSTRACT

Transmission synchronization and bandwidth adjustment in a broadcast system are described. At least one service tool in the broadcast system supplies service information useful for selecting, from a series of broadcast events, broadcast events to be viewed by subscribers of the broadcast system. A conditional access (CA) unit in the broadcast system applies conditional access attributes to the series of broadcast events. Transmission synchronizing apparatus in the broadcast system synchronizes the CA unit and the at least one service tool by instructing the CA unit to blackout a particular event from the series of broadcast events to subscribers that are refused access to the particular event and instructing the at least one service tool to provide a replacement service to the subscribers that are refused access to the particular event. Alternatively or additionally, the transmission synchronizing apparatus adjusts transmission bandwidth allocated to the series of broadcast events in response to instructing the CA unit to blackout the particular event to subscribers that are refused access to the particular event and instructing the at least one service tool to provide the replacement service to the subscribers that are refused access to the particular event. Related apparatus and method are also described.

11 Claims, 3 Drawing Sheets

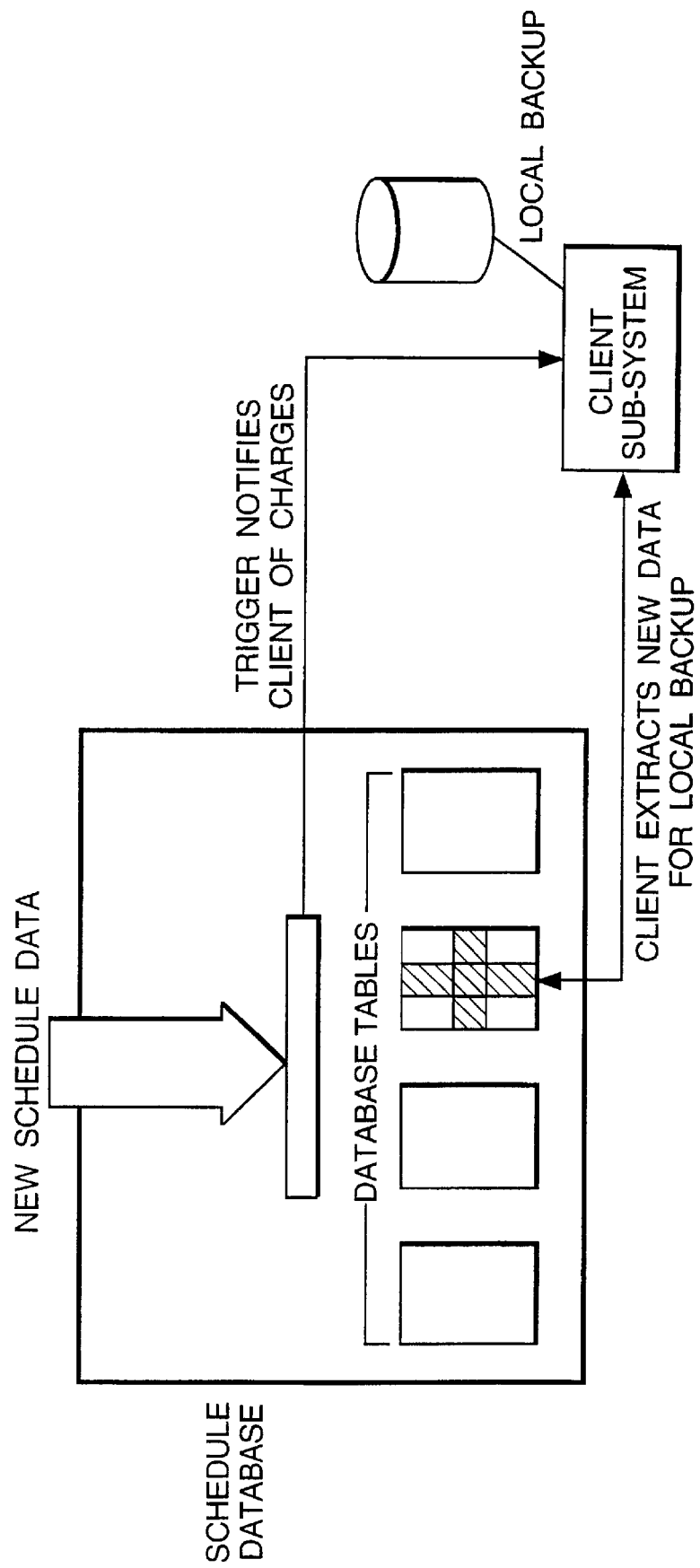

DIGITAL VIDEO BROADCAST SYSTEM

PRIORITY CLAIM

This is a U.S. national stage of application Ser. No. 09/171,323, filed on Nov. 3, 1998. Priority is claimed on that application and on British application no. PCT/GB97/01025, filed on Apr. 15, 1997 and Provisional U.S. application No. 60/015,460, filed on Apr. 15, 1996.

FIELD OF THE INVENTION

This invention relates to a Digital Video Broadcast (DVB) system, in particular to a system and method for integrating and managing the components of such a system in a manner which improves overall data throughput and control thereof.

BACKGROUND OF THE INVENTION

In a typical DVB system there are often a number of functions which must be coordinated and synchronized. Each of these functions are generally controlled independently by a separate system which is controlled by an individual user. In this manner it is not unusual for a given function to be coordinated and controlled on two separate levels, which is obviously an unnecessary waste of resources. In addition the individual user may set restrictions and operating criteria which badly affect the operation of the broadcast as a whole. A further problem which can arise is in relation to the scheduling of programs and the transmission of data. If there are unexpected changes to the scheduling, such as a ball game going into extra time or a news flash, the changes caused may influence all other events and programs. This can mean that each operator of the individual functions has to amend the inputs to the broadcaster. This is inconvenient and time consuming.

In addition, conventional systems do not centralize all of the required information to provide comprehensive engineering and monitoring facilities.

SUMMARY OF THE INVENTION

According to one aspect of the present invention, there is provided an automatic system for managing the components of a digital video broadcast system in response to scheduling of, or one or more rescheduling changes to, the event scheduling of broadcast events. The broadcast system is operative to generate an output digital multiplex signal comprising plural channels and having system elements comprising an event synchronizer including a data cache, a service information controller, a multiplexer, a multiplexer controller, and a conditional access controller including a broadcast control center.

The automatic file system comprises: updating means for updating the data stored in the data cache in response to the broadcast events, the rescheduling change or changes to the scheduling of broadcast events; synchronizing means for synchronizing the updated data in real time across the different system elements to ensure correct referencing; and formatting means for formatting the multiplexer according to the broadcast events, or the rescheduling change or changes in the event scheduling of broadcast events.

According to a second aspect of the invention, there is provided a method for managing the components of a digital video broadcast system in response to scheduling of, or one or more rescheduling changes to, the event scheduling of broadcast events. The broadcast system being operative to generate an output digital multiplex signal comprising plural channels and having system elements comprising an event synchronizer including a data cache, a service information controller, a multiplexer, a multiplexer controller, and a conditional access controller including a broadcast control.

The method comprises the steps of: updating the data stored in the data cache in response to the broadcasting events or the rescheduling change or changes to the scheduling of broadcast events; synchronizing the updated data in real time across the different system elements to ensure correct referencing; and [;] formatting the multiplexer according to the broadcast events or the change or changes in the scheduling.

Among the many advantages of the present invention over the prior art, the present invention centralizes and facilitates the management of a digital video broadcast system. This is accomplished by bringing together many of the functions of the prior art and enabling changes to made in one central place and having the information disseminated to any other point that needs to know. Without the present invention, responding to unexpected changes was physically impossible. Now, unexpected changes are dealt with without problem. Multiplex management is facilitated further by enabling easy reapportionment of bit streams across multiplexers.

The present invention also provides advantages over the prior art by reducing the number of interfaces that are required between the different systems. In a typical prior art system traffic would have to talk directly to the automation system, the multiplexers, and conditional access systems, The automation system would have to talk to the multiplexers and conditional access systems. Synchronizing all these different changes is problematical. With the present invention the traffic system talks to the AFS, the automation system talks to the AFS, and the AFS co-ordinates the required changes with the downstream systems.

BRIEF DESCRIPTION OF THE DRAWINGS

Reference will now be made, by way of example, to the accompanying drawings, in which:

FIG. 3 shows the software configuration for the system.

DETAILED DESCRIPTION OF A PREFERRED EMBODIMENT

Figure 1:
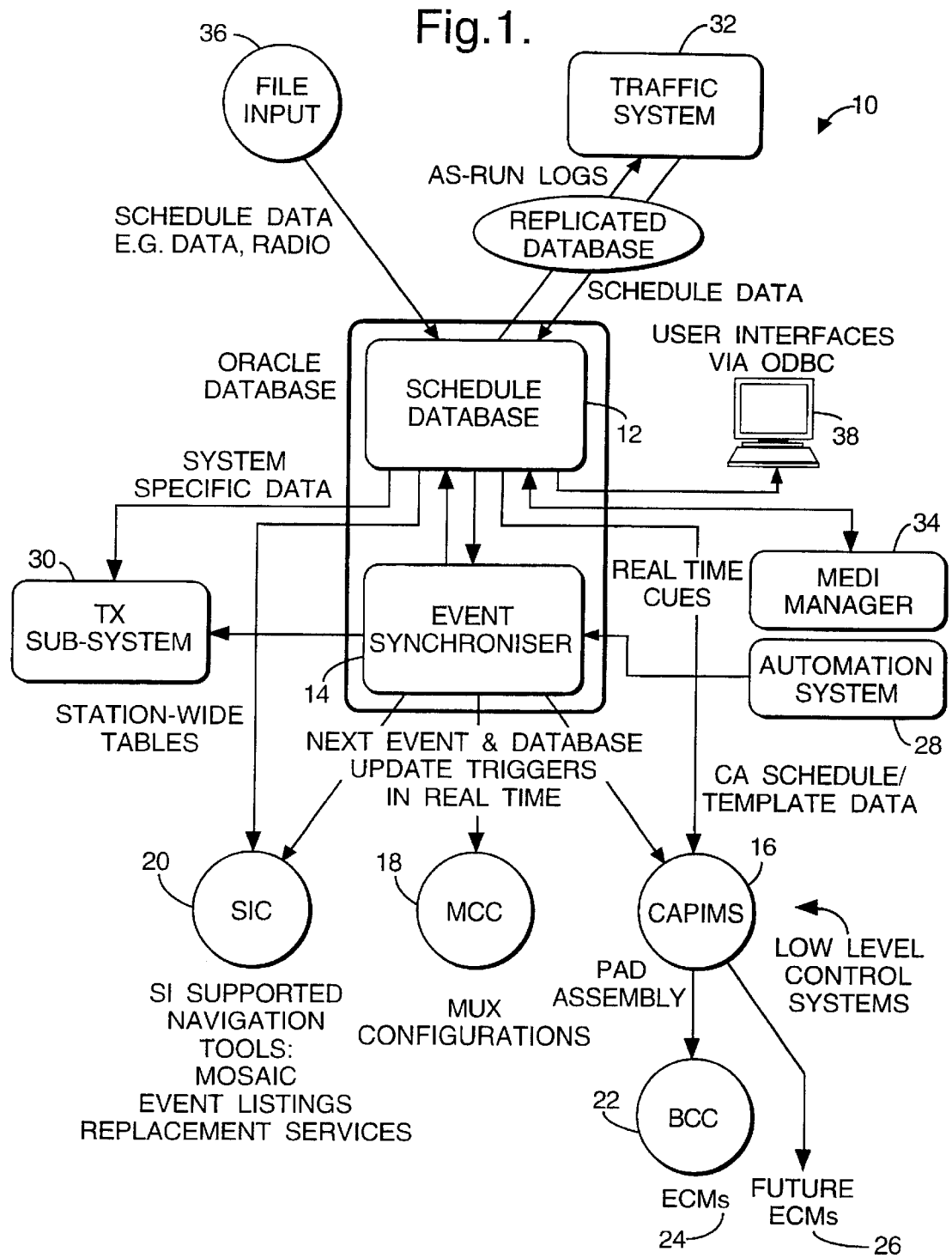
FIG. 1 is a block diagram of a preferred embodiment of the present invention.

In a DVB system there are a number of functions which must be controlled. The system of the present invention, referred to as the automatic file server (AFS), bridges a critical gap in the range of studio control systems which are required to construct a multiplexed digital video broadcast (DVB) system. The AFS 10 illustrated in FIG. 1 provides a number of functions. It provides a monitoring and control point for managing the total multiplex, and controlling the mix of services being transmitted. The system fulfils most of the software integration requirements in a broadcast center. A central database, held in the operational areas, is provided and is the reference point to which other systems refer. A large protocol converter (not shown) which forms part of the event synchronizer 14 is provided which links the scheduling system to the playout and conditional access (CA) systems.

The protocol converter is responsible for data translation from the AFS 10 internal format into messages that can be understood by the conditional access and associated program information (CA-PIMS) 16, multiplex control (MCC) 18 and service information control (SIC) 20.

This type of system is useful in a situation presenting a variety of requirements, either alone or in combination, that must be met. The system is also useful when addition or removal of services is required within the Multiplex at any time during operation. When using CA blackouts and replacement services or near video on demand (NVOD) services and associated pay per view events, the inventive system provides an invaluable tool as explained below. In addition, when merging independent schedules from diverse services and using a central editing point for schedules and network tables, the AFS 10 affords advantages over the prior art. For example, when monitoring the services across a multiplexer (mux) and when warning of bit-rate overload the AFS 10 can provide improved performance.

The major functions provided by the AFS 10 will be described in more detail below]. They generally include the use of the AFS 10 as a tool for multiplex management, as a cohesive system within the studio complex, and as a central repository of information for all the different types of schedule driven systems.

Referring again to FIG. 1, a typical AFS system 10 is implemented in two parts, namely a schedule database 12 utilizing for example Oracle 7.0 and a real-time cache system (the Event Synchronizer 14), which improves the resilience of the system to failure and increases its data throughput.

The AFS 10 monitors the state of all of the on-air services event by event and formats the digital multiplex to accept them. In addition, the AFS 10 also synchronizes the data across all the playout systems so they reference each other correctly. The location of the AFS 10 in the playout hierarchy also makes possible a number of important operational facilities which are described in greater detail below.

The automation system 28 is the part of the broadcast system responsible for the playout of source material according to the schedule provided by the traffic system 32. The source material could be provided by video or audio tapes, disks or other media.

The media manager 34 is responsible for keeping track of the source material and the location of the source—for example, if the source material is held on tape it knows which tape holds the required material.

The event synchronizer 14 controls a number of systems and provides real time control of a number of them. These include conditional access and associated program information (CAPIMS) 16, multiplex control (MCC) 18 and service information control (SIC) 20 and the associated supported navigation tools. The CAPIMS system includes a broadcast control center (BCC) 22 which produces entitlement control messages (ECMs) 24 which are transmitted via the MUX and future ECMs 26 which are stored on the AFS 10 for later transmission via the SIC 20. The SIC supported Navigation tools include, for example, Mosaic, event listings and replacement services which can make up an electronic program guide (EPG). The event synchronizer 14 receives real time messages from an automation system 28 and passes them to all of the transmission related control systems including the transmission sub-system 30. In the situation where the automation system 28 is unavailable the same messages can be simulated by the event synchronizer 14, using the nominal schedule time of the event. The schedule database 12 has two-way communications with the event synchronizer 14, a traffic system 32 and a media manager 34. The schedule database 12 receives data from either the traffic system or from a file input 36 and transmits information to the transmission sub-system 30, which include the SIC 20, the CAPIMS 16 and one or more user interfaces 38 via an open database connectivity (ODBC).

The schedule database 12 is the storage point for all attributes related to a program events e.g., nominal start time, the start of a message, CA services, blackout restrictions and the number of subtitle languages. The database is used by 'client' sub-systems which draw off the relevant data they require. The definition of this data set effectively defines the operation of the DVB system.

The structure of the database is designed based upon an analysis of the information required to control the downstream systems and holds the data in an appropriate form.

The event synchronizer 14 acts as the real-time element of the database. The event synchronizer 14 caches approximately 6 hours of schedule data in memory to guard against down-time of the schedule database 12. By holding this data in memory, the event synchronizer can respond very quickly to real-time cues. Thus, the playout system is free to insert, drop or move events as program requirements dictate, while the event synchronizer 14 can prepare the downstream systems with no additional overhead.

The automation system 28 could do this task directly if it were designed with MUX control in mind. However, given that there may be a video playout system, a radio automation system and a data playout system, the event synchronizer 14 provides the most open architecture while requiring little extra customization of the other systems.

The MCC 18, the CA(PIMS) 16 and the SIC 20 make up what is known as the low-level control systems. The actual function of each is described in greater detail below.

The multiplexer control computer (MCC) controls the multiplexer with regard to the combination of all the video, audio and data components and their various characteristics. Information within the event synchronizer 14 informs the mux about the bit rate that should be allocated to each service, and the list of components associated with the current events.

The AFS 10 has a valuable role in the integration of the CA system with the MCC 18 in that it assigns the correct encryption key (ECM) to each service or component.

The CA interfacing philosophy balances the needs of both CA security and traffic system flexibility. The CA 16 must operate in a secure environment and be responsible for the low-level formatting of instructions to the subscriber smart card. CA-PIMS 16 provides a high-level interface which protects this operation. The traffic system should be able to assign particular CA parameters to events using a simple set of pre-configured instructions, but also in such a way that they can be fine tuned if necessary. The traffic system must also be able to derive the detail in these instructions, so that censorship violations can be spotted early in the scheduling process.

The interfacing method adopted uses a series of templates which can be equally applied on a simple subscription per channel basis, but also control complex mapping pay per view (PPV) events and taping instructions.

The service information controller (SIC) 20 provides information within the broadcast data stream so that the subscriber receiver (IRD) can locate all the services being transmitted. The information held on the SIC 20 is mastered in the AFS 10 system and ultimately by the traffic system. This data can be viewed as a list or groups of services, and can also be supported using mosaics or more complex composite pages of video and text.

If the CA system 16 is requested to blackout a particular event, a 'replacement' service can be flagged within the SIC 20 which will be used if the subscriber is refused access to the particular service. When the blackout event finishes, the SIC 20 informs the subscriber IRD to switch back to the normal service.

Without the AFS 10 there is no easy method of evaluating the mix of services being transmitted within the digital transport stream. Whenever bandwidth is at a premium, bit rates will need to be adjusted in order to allow the flexible addition and removal of services.

The AFS 10 provides a method of viewing the mux wide view and consequently can be used to re-apportion bit rates as business requirements develop. An example of how this could work is where different services are provided during the day to those during the night. For example it may be possible to have 7 normal channels which can be augmented by 3 further data channels at night. If the merging of the additional channels is handled by the AFS 10, then any unexpected events, such as a ball game running into extra time can be taken into consideration. If the game is scheduled to finish at 10:00 PM but doesn't and the extra channels are due to start at the end of the game any changes can be easily handled by the AFS 10, such that the transmission of the extra channels is delayed until the game does actually finish.

The advantages of using a digital conditional access system 16 from a scheduling perspective are that specific events can be given individual access parameters. These types of event include, pay per view events, black-out events across regional and demographic boundaries (e.g. close to the venue of a sports event) and replacement services needed to overcome censorship violations.

As mentioned above, the operational management must focus not only on an individual channel, but also at the mux layer. Many automation systems cannot provide a multi-channel view of schedules—which is where the AFS 10 can provide a very useful editing facility and tool. The editing point can be utilized locally by transmission controllers or remotely via traffic system personnel. The effect of the AFS 10 is to take the scheduling directly to the heart of the transmission system such that events about to be transmitted are now accessible to the topmost scheduling process. Thus, if there are any changes they can be entered at one point only and dynamically disseminated to any other point which needs to know. This allows the system to have strong control over features such as delays, overloads and the like.

The editing capabilities of the AFS 10 are such as to allow changes to be made from a traffic system at any time up to broadcast time. User interfaces are also provided that allow last-minute changes to be made simply. Any required changes need only be made in place and the information is automatically distributed to all relevant systems. This is an important advantage over prior art systems. The present invention also allows, from a central point, monitoring of bandwidth allocation on all multiplexers as well as allowing bandwidth allocation to be adjusted on an event-by-event basis to optimize usage of any program stream.

Figure 2:
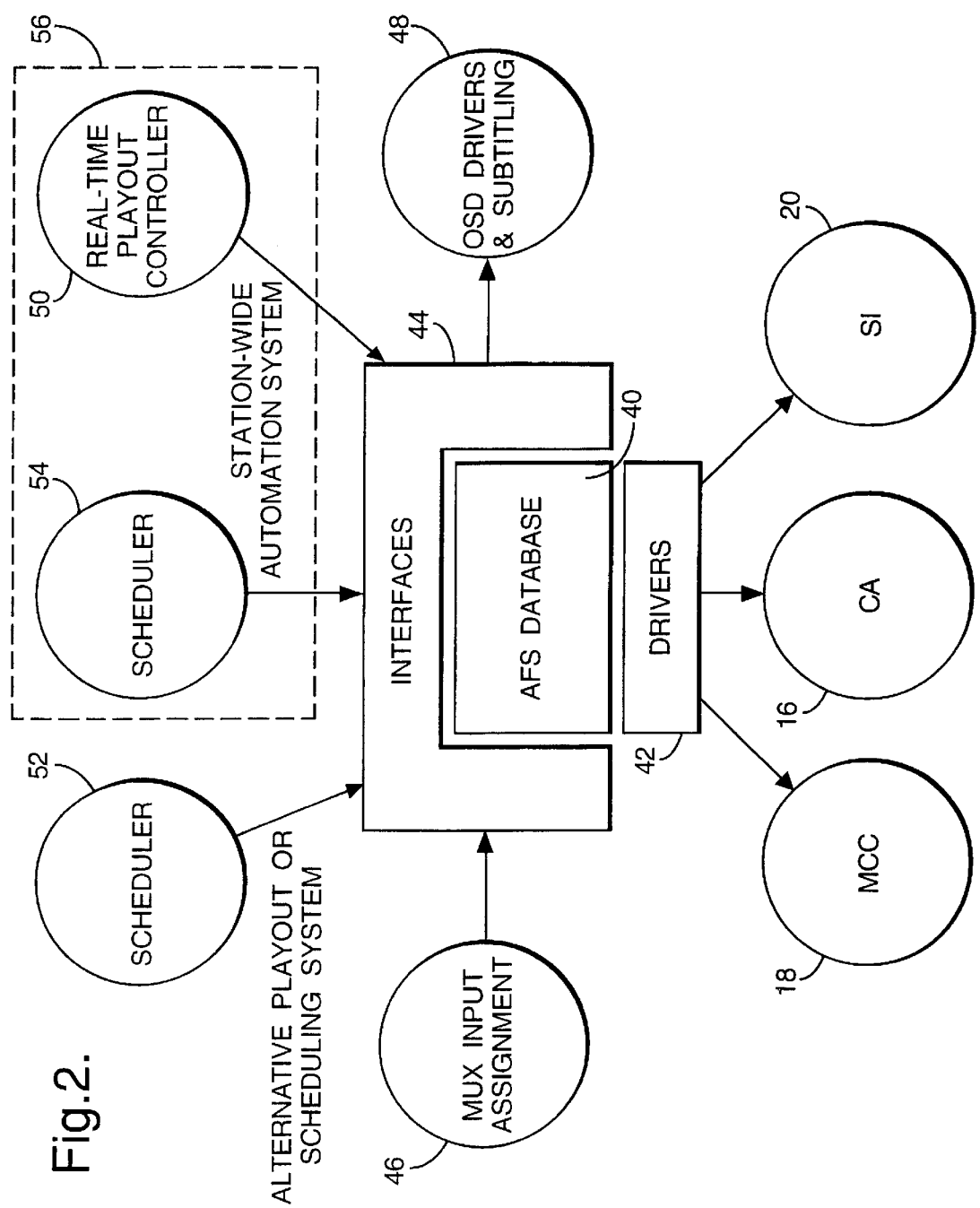
FIG. 2 is a block diagram showing the interfaces adopted in the FIG. 1 system.

FIG. 2 illustrates that the AFS 10 supports interfaces to two categories of system, the low level control systems mentioned above and the higher level systems discussed in greater detail below. Low level drivers are used to interface to the three systems which control the make-up of the DVB multiplex. Custom interfaces have been developed to support high level studio system for scheduling and program layout.

The custom interfaces provide interfaces between schedule database 12 and both traffic system 32 and file input 36. The traffic system provides direct filling of the AFS database 40, however, with file input 36 parsers are required to translate the information in the files into data suitable for populating the AFS database tables.

The present invention also provides advantages over the prior art by reducing the number of interfaces that are required between the different systems. In a typical prior art system, traffic would have to talk directly to automation, the muxes, and conditional access systems, and automation would have to talk to the muxes and conditional access systems. Synchronizing all of these different changes is problematical. With the present invention, traffic talks to the AFS 10, automation talks to the AFS 10, and the AFS co-ordinates the required changes with the down-stream systems.

The AFS database 40 is shown in FIG. 2 and has drivers 42 and interfaces 44 associated therewith. The drivers control communications to the MCC 18, the CA 16 and the SI modules 20. The interfaces provide the links to a mux input assignment module 46, an on-screen display driver and subtitling module 48, a real time playout controller 50 and one or more schedulers 52, 54. The first scheduler 52 is part of an alternative playout or scheduling system and the second 54 is part of a station-wide automation system 56.

The high-level studio systems mentioned above which are provided by the system can be categorized into a traffic system, an automation system 28 and a number of user interfaces.

The traffic system is actually a shorthand term which describes a large number of program scheduling and material management systems. 'Traffic' represents the point at which this data is merged to produce a specific program schedule in detail. The AFS 10 supports two types of interface to the traffic system, either an ODBC interface 38 which allows database replication and hence is very responsive to changes, or a flat-file interface which supports 'snapshot' schedule transfers. The AFS 10 can therefore support schedule downloads from a number of diverse scheduling systems ranging from main frame machines to personal computers.

The studio automation system utilizes the AFS schedule database as its source of play lists for one or more channels. As with the other client systems, these lists are filtered to extract only the relevant fields which are required.

In the reverse direction, real-time event cues generated by the automation system 28 are sent to the event synchronizer 14. Two cues are normally generated—a 'tension' command which is sent approximately 20 seconds before an event begins, or a 'take' command at the actual program transition. The automation system references the events concerned in the event synchronizer-memory by event number which in turn sends a translated message to each client's system.

Since the two cues from the automation system 28 are relatively simple, the AFS 10 is not tied to working with one particular type of automation system.

In order to implement the key features of the invention, a number of user interfaces are required. The types of interface which must be supported relate to mux-wide edit views, network information table settings (satellite polarization, frequency etc.), mux-wide component views including CA keys and bit rate, maintenance and alarm terminals, and a status display showing current on-air events and next events on a station-wide basis. The status display may be available as a video feed which can be displayed in monitor racks. In general the displays are configurable on a system by system basis.

As previously mentioned the schedule database 12 can be based upon an Oracle database such as the Oracle 7 RDBMS. The interface to the various client systems is achieved using triggers as illustrated in FIG. 3. The triggers are configured to notify the sub-systems of changes to the data which affects them. The client systems are then responsible for querying the relevant tables to extract the new information. This exploits the in-built connectivity of the system.

The secondary benefit of this type of interfacing approach is that the server is not responsible for updating a client system if the latter fails or switches over to a backup system. In these cases, it is also possible for the server to know the state of the failed system.

The event synchronizer 14 does however run custom software to provide the real-time messages to the client systems. In this instance, the trigger method is too cumbersome to translate the cues from the automation system 28 and the event synchronizer 14 generates it's own custom real time messages. This is shown in FIG. 1.

The custom software on the event synchronizer 14 receives real-time cues from the automation system 28 which identify the start of program events. This cue information is distributed by the event synchronizer 14 to the relevant downstream systems which, acting on this 'event-starting' information perform appropriate system reconfigurations.

In a preferred embodiment the hardware configuration utilizes separate redundant pairs of servers, for both the synchronizer 14 and the database 12. The database servers are designed with data integrity as their most critical design feature. Down-time in the database is masked by the synchronizer configuration, which utilizes switch-over software to ensure an extremely rapid use of the backup system. Each of the sub systems can independently maintain their own local data backup which offers protection against network failure.

Hardware reliability is provided by a number of features which occur in the event of a failure. Disks are protected against failure by using a mirrored disk system. Power supply failure is provided for by the use of automatic switch over to another system. Automatic failure recovery software provides for the event of a processor or memory failure. In the event of complete bus failure, the software package automatically switches to the secondary server. The system is based upon a redundant network architecture. In the event of a client failure the operator can move to a backup machine and continue working.

The main feature of the AFS tool have been detailed above, it will however be evident that a number of variations of the system are possible which will be evident to the person skilled in the art.

What is claimed is:

1. A broadcast system for preparing a series of broadcast events for transmission in a bandwidth adjusted multiplexed form, the system comprising:
    at least one service tool operative to supply service information useful for selecting, from said series of broadcast events, broadcast events to be viewed by subscribers of the broadcast system;
    a conditional access (CA) unit operative to apply conditional access attributes to said series of the broadcast events; and
    transmission synchronizing apparatus operatively associated with said CA unit and said at least one service tool and operative to adjust transmission bandwidth allocated to said series of broadcast events in response to instructing the CA unit to blackout a particular event from said series of broadcast events to subscribers that are refused access to said particular event and instructing the at least one service tool to provide a replacement service to said subscribers that are refused access to said particular event.

2. The system according to claim 1 and also comprising a transmitter operatively associated with said transmission synchronizing apparatus and operative to transmit said series of broadcast events in a bandwidth adjusted multiplexed form, bandwidth adjusted by said transmission synchronizing apparatus.

3. The system according to claim 1 and also comprising a schedule database unit operatively associated with said at least one service tool and said transmission synchronizing apparatus and operative to assign at least one play attribute to at least one broadcast event comprised in said series of broadcast events.

4. The system according to claim 3 and also comprising an event player unit operatively associated with said schedule database unit and said transmission synchronizing apparatus and operative to play said series of broadcast events in accordance with a schedule that takes into account said at least one play attribute.

5. The system according to claim 3 and wherein said at least one play attribute comprises a blackout restriction attribute including a play attribute of said replacement service.

6. The system according to claim 1 and wherein said transmission synchronizing apparatus is also operative to cause said replacement service to be flagged into the at least one service tool for use by said subscribers that are refused access to said particular event.

7. The system according to claim 1 and wherein said transmission synchronizing apparatus is also operative to cause the at least one service tool to instruct IRDs of said subscribers that are refused access to said particular event to switch back to normal service after said particular event is terminated.

8. A method for preparing a series of broadcast events for transmission in a bandwidth adjusted multiplexed form, the method comprising:
    providing at least one service tool operative to supply service information useful for selecting, from said series of broadcast events, broadcast events to be viewed by subscribers of the broadcast system and a conditional access (CA) unit operative to apply conditional access attributes to said series of broadcast events; and adjusting, a transmission synchronizing apparatus operatively associated with said CA unit, transmission bandwidth allocated to said series of broadcast events from said series of broadcast events to subscribers that are refused access to said particular event and instructing the at least one service tool to provide a replacement service to said subscribers that are refused access to said particular event.

9. The method according to claim 8 and also comprising transmitting said series of broadcast events in a bandwidth adjusted multiplexed form.

10. The method according to claim 8 and also comprising causing said replacement service to be flagged into the at least one service tool for use by said subscribers that are refused access to said particular event.

11. The method according to claim 8 and also comprising causing the at least one service tool to instruct IRDs of said subscribers that are refused access to said particular event to switch back to normal service after said particular event is terminated.

* * * * *

UNITED STATES PATENT AND TRADEMARK OFFICE
CERTIFICATE OF CORRECTION

PATENT NO. : 6,772,435 B1
DATED : August 3, 2004
INVENTOR(S) : Nicholas Thexton

It is certified that error appears in the above-identified patent and that said Letters Patent is hereby corrected as shown below:

Column 8,
Line 38, claim 8 should read:
8. A method for preparing a series of broadcast events for transmission in a bandwidth adjusted multiplexed form, the method comprising:
 providing at least one service tool operative to supply service information useful for selecting, from said series of broadcast events, broadcast events to be viewed by subscribers of the broadcast system and a conditional access (CA) unit operative to apply conditional access attributes to said series of broadcast events; and adjusting a transmission synchronizing apparatus operatively associated with said CA unit, transmission bandwidth allocated to said series of broadcast events in response to instructing the CA unit to blackout a particular event from said series of broadcast events to subscribers that are refused access to said particular event and instructing the at least one service tool to provide a replacement service to said subscribers that are refused access to said particular event.

Signed and Sealed this

Fourth Day of January, 2005

JON W. DUDAS
*Director of the United States Patent and Trademark Office*